UNITED STATES PATENT OFFICE.

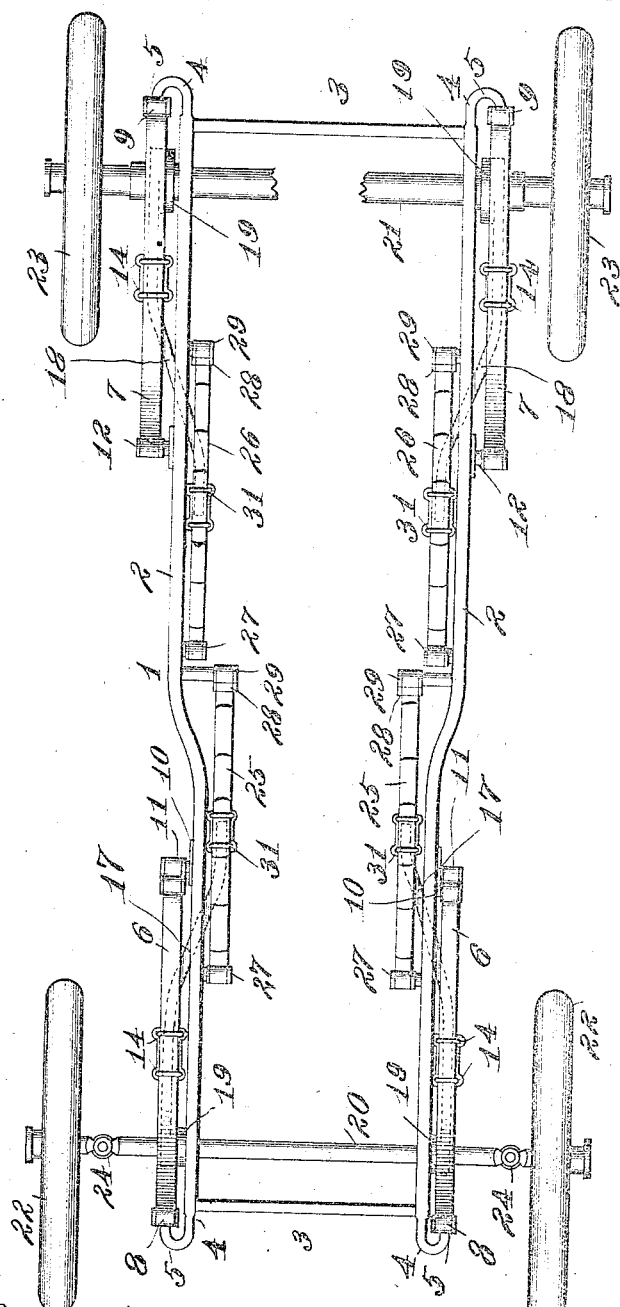

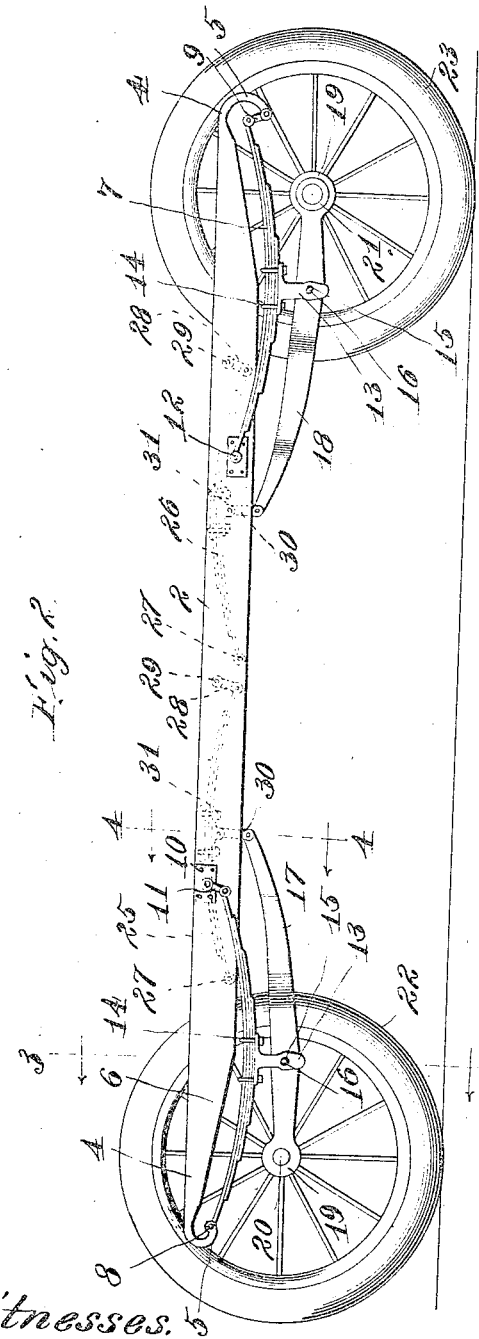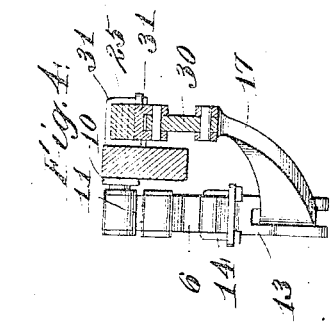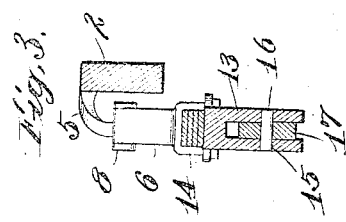

HARRY W. HANCOCK, OF CHICAGO, ILLINOIS.

RUNNING-GEAR FOR VEHICLES.

No. 884,488.  Specification of Letters Patent.  Patented April 14, 1908.

Application filed September 23, 1904. Serial No. 225,628.

*To all whom it may concern:*

Be it known that I, HARRY W. HANCOCK, a citizen of the United States, residing at Chicago, in the county of Cook and State of Illinois, have invented certain new and useful Improvements in Running-Gear for Vehicles, of which the following is a specification.

Vehicle springs, so far as I am aware, have been arranged only to sustain or carry the vehicle body and its load. When the wheels surmount an obstacle the rebound of the springs throws the load upwardly, and if the progress of the vehicle is rapid the upward throw of the springs is violent, being attended with danger of breakage of the springs and discomfort to the passengers.

The object of this invention is the production of a running gear for vehicles in which such sudden upward tendencies of the carrying springs are compensated for by a restraining downward pull upon the vehicle body.

The invention further refers to a vehicle having its wheels supported upon pivoted carrying arms and having means for cushioning the pivotal movement of said arms.

A further object of the invention is the production of a running gear for vehicles embodying the improvements hereinafter more particularly described.

In its application to automobiles this running gear has the advantage of providing a relatively long wheel base without sacrificing the length and strength of the springs. Such a wheel base not only conduces to easy riding but permits the engine to be placed rearward of the forward axle and thus nearer the ground than when mounted over said axle; also the rear wheels are sufficiently rearward to permit of side entrances to the tonneau. To these features also this invention relates.

In the accompanying drawings, Figure 1 is a top plan view of a running gear embodying my invention. Fig. 2 is a side elevation of said running gear. Fig. 3 is a section through one of the carrying springs on dotted line 3 3 of Fig. 2. Fig. 4 is a sectional view through one of the compensating springs, taken on dotted line 4 4 of Fig. 2.

In the construction of a vehicle embodying the features of this invention, I provide a bed frame 1 comprising side bars 2 and end bars 3 rigidly secured together. The side bars extend substantially the full length of the vehicle, and a little distance forwardly from their middle portions are bent inwardly to make the forward end of the bed frame somewhat narrower than the rear portion. This latter feature, it will be understood, is not essential, but is merely a matter of common construction. The extreme ends of the side bars 2 are reduced in size and are bent downwardly and outwardly, forming necks 4 which necks terminate in the bifurcated and perforated brackets 5. The semi-elliptical carrying springs 6 and 7, in pairs, at the opposite side of the bed frame (the former at the forward end and the latter at the rear end of said bed frame) are connected at their outer ends with brackets 5, the forward spring by means of rivets 8 extending through the usual eyes formed in the ends of said springs and the rear springs 7 by means of links 9 pivotally mounted in brackets 5, at the rear end of the frame. The rear end of the spring 6 is pivotally connected with the bed frame 1 by means of a bracket 10 and a pivotal link 11 and the forward end of the spring 7 with said frame by means of a stud 12 extending outwardly from the side bars 2 of the bed frame.

At their middle portions and upon their under sides the carrying springs 6 and 7 are each provided with bifurcated brackets 13 secured to said springs by means of the clips 14 of common construction. At their lower ends the arms of the bifurcated brackets 13 are provided with the alined bearings 15 through which pivot bolt or rivet 16 is adapted to extend. Carrying levers 17 and 18, also in pairs, are adapted to be mounted, one of said levers in each of the brackets 13 upon the pivot 16 therein. At their outer ends these carrying levers 17 and 18 are in sleeve form, as at 19, to receive the axles 20 and 21 respectively, the former the forward axle and the latter the rear axle of the vehicle. The axles 20 and 21 carry the usual front and rear wheels 22 and 23, the former of which may be mounted upon steering gear (not shown) for guiding the vehicle.

The weight of the vehicle resting upon the wheels 22 and 23 will exert a downward pull upon the inner ends of the carrying levers 17 and 18, and this downward pull is sustained by the semi-elliptical compensating springs 25 and 26, in pairs, for the levers 17 and 18, respectively, one of said springs being provided for each lever. The springs 25 and 26 are mounted upon the inner faces of the side bars 2, being secured at their forward ends to the pins 27 extending inwardly from said bars, and at their rear ends being sustained by means of pivotal links 28 mounted upon pins 29 also fixed to and extending inwardly from the side bars 2. In order to bring the inner ends of the carrying levers 17 and 18 directly under the springs 25 and 26, said levers are bent inwardly from the brackets 13, and their inner ends are connected with the middle portions of the sustaining springs 25 and 26 by means of links 30, one of which is secured to each of said springs by a clip 31.

When any of the wheels of the vehicle hereinbefore described strike an obstruction, said wheels are thrown upward, compressing the carrying springs above said wheels. The upward movement of the wheels produces a downward pull upon the compensating springs at the inner ends of the carrying levers supporting the wheels that were so raised. This downward movement tends to overcome the upward throw of the carrying springs, modifying the force of the upward movement of the vehicle body without in any way interfering with the function of the carrying springs in absorbing the upward blow of the obstruction against the wheel. By changing the relative pivotal points of the carrying levers 17 and 18 and the relative tension of the carrying springs 6 and 7 and the compensating springs 25 and 26 different effects in the operation of the springs may be obtained.

My invention is not restricted to the particular construction and arrangement of the parts herein set forth as such construction and arrangement may be modified or varied by those skilled in the art without departing from the spirit and scope of my invention, for instance, the springs may be supported otherwise than as shown, and the compensating springs may be omitted and the rear ends of the carrying arms 17 and 18 made resilient.

I claim as my invention:

1. In a running gear for vehicles, in combination, a bed frame; and means for supporting said bed frame comprising a spring at each end of said bed frame said spring being attached at each of its ends to said bed frame, a wheel-carrying arm pivotally connected intermediate its ends with each of said carrying springs and adapted to support an axle at one end, and means for yieldingly connecting the other end of each of said carrying-arms with said bed frame.

2. In a running gear for vehicles, in combination, a bed frame; a carrying spring connected at each of its ends with said bed frame; a wheel-carrying arm pivotally connected with said spring intermediate the ends of said spring; and a spring connected with said bed frame and said wheel-carrying arm and adapted to exert its force in opposition to said carrying-spring.

3. In a running gear for vehicles, in combination, a bed frame; a carrying spring pivotally connected at one of its ends with said bed frame and at its other end having a link connection with said frame; a wheel-carrying arm pivotally connected with said spring intermediate the ends of said spring; and means connected with said wheel-carrying arm and said bed frame for exerting a downward pull upon said bed frame to limit the movement of said carrying spring.

4. In a running gear for vehicles, in combination, a bed frame; a semielliptical carrying spring pivotally connected at one of its ends with said bed frame and at its other end having a link connection with said frame; a wheel-carrying arm pivotally connected with said spring; and means connected with said wheel-carrying arm and said bed frame for exerting a downward pull upon said bed frame to limit the movement of said carrying spring.

5. In a running gear for vehicles, in combination, a bed frame; a semielliptical carrying spring connected at each of its ends with said bed frame; a lever pivotally connected intermediate its ends with said carrying spring and adapted to rotatably support a wheel upon its shorter arm; and a spring connected with the longer arm of said lever and with said bed frame and adapted to exert its power in opposition to said carrying spring.

6. An automobile running gear comprising a bed frame; means for supporting one end of said bed frame; a semielliptical spring at each side of the other end of said bed frame; two levers each pivotally connected at a point between its ends with the middle portion of one of said springs; an axle carried at one end of said levers; and springs connecting the opposite ends of said levers with the bed frame.

7. In a running gear for vehicles, in combination, a bed frame; semi-elliptical springs pivotally connected at one end to one end of said bed frame, and having a link connection at their opposite end with said frame; a wheel-carrying lever pivotally connected intermediate its ends with the middle portion of each of said springs, said lever being adapted to support a wheel at one end; and means for yieldingly connecting the opposite end of said lever with said bed frame.

8. In a running gear for vehicles, in combination, a bed frame; semi-elliptical springs pivotally connected at one end to one end of said bed frame, and having a link connection at their opposite end with said frame; a wheel-carrying lever pivotally connected intermediate its ends with the middle portion of each of said springs, said lever being adapted to support a wheel at one end; and a semi-elliptical spring for yieldingly connecting the opposite end of said lever with said bed frame.

9. In a vehicle frame, in combination, a bed having a downwardly-turned member at the rear end thereof; a spring secured to the bed and to the member; a lever pivotally connected to said spring; an axle in fixed relation to one end of said lever; and a spring for supporting said lever at its opposite end.

HARRY W. HANCOCK.

Witnesses:
  L. L. MILLER,
  M. M. DALEY.